(12) United States Patent
Gill (10) Patent No.: US 6,680,828 B2
(45) Date of Patent: Jan. 20, 2004

(54) DIFFERENTIAL GMR HEAD SYSTEM AND METHOD USING SELF-PINNED LAYER

(75) Inventor: Hardayal Singh Gill, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 10/165,562

(22) Filed: Jun. 7, 2002

(65) Prior Publication Data

US 2003/0227721 A1 Dec. 11, 2003

(51) Int. Cl.[7] .................................................. G11B 5/39
(52) U.S. Cl. ........................................................ 360/314
(58) Field of Search .......................... 360/314, 324.11, 360/324.12

(56) References Cited

U.S. PATENT DOCUMENTS 6,055,136 A * 4/2000 Gill et al. ................... 360/314
6,278,589 B1 * 8/2001 Gill ............................ 360/314
6,396,734 B2 * 5/2002 Ishikawa et al. ............ 365/158
6,469,873 B1 * 10/2002 Maruyama et al. ......... 360/314

* cited by examiner

Primary Examiner—A. J. Heinz
Assistant Examiner—Angel Castro
(74) Attorney, Agent, or Firm—Silicon Valley IP Group, PC; Dominic M. Kotab (57) ABSTRACT

A magnetoresistive read (MR) sensor system and a method for fabricating the same are provided. First provided are a first ferromagnetic layer, a first spacer layer positioned above the first ferromagnetic layer, and a second ferromagnetic layer positioned above the first spacer layer for working in conjunction with the first ferromagnetic layer to define a first sensor. An antiparallel coupling layer is positioned above the second ferromagnetic layer to separate the first sensor from a second sensor. The second sensor is defined by a third ferromagnetic layer positioned above the antiparallel coupling layer, a second spacer layer positioned above the third ferromagnetic layer, and a fourth ferromagnetic layer positioned above the second spacer layer.

23 Claims, 8 Drawing Sheets

$$\frac{\Delta R}{R} \approx 3\text{–}4\%$$

DIFFERENTIAL GMR HEAD SYSTEM AND METHOD USING SELF-PINNED LAYER

FIELD OF THE INVENTION

The present invention relates to magnetoresistive read (MR) sensors for reading signals recorded in a magnetic storage medium, and more particularly, this invention relates to improving the design of an MR sensor.

BACKGROUND OF THE INVENTION

Computer systems generally utilize auxiliary memory storage devices having media on which data can be written and from which data can be read for later use. A direct access storage device (disk drive) incorporating rotating magnetic disks is commonly used for storing data in magnetic form on the disk surfaces. Data is recorded on concentric, radially spaced tracks on the disk surfaces. Magnetic heads including read sensors are then used to read data from the tracks on the disk surfaces.

In high capacity disk drives, magnetoresistive read sensors, commonly referred to as MR heads, are the prevailing read sensors because of their capability to read data from a surface of a disk at greater linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization of the MR element and the direction of sense current flowing through the MR element. Recorded data can be read from a magnetic storage medium because the external magnetic field from the recorded magnetic storage medium (the signal field) causes a change in the direction of magnetization in the MR element, which in turn causes a change in resistance in the MR element and a corresponding change in the sensed current or voltage.

Another type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers.

GMR sensors using only two layers of ferromagnetic material separated by a layer of non-magnetic electrically conductive material are generally referred to as spin valve (SV) sensors manifesting the GMR effect (SV effect). In a spin valve sensor, one of the ferromagnetic layers, referred to as the pinned layer, has its magnetization typically pinned by exchange coupling with an antiferromagnetic (e.g., NiO, FeMn, PtMn) layer. The magnetization of the other ferromagnetic layer, referred to as the free layer, however, is not fixed and is free to rotate in response to the field from the recorded magnetic storage medium (the signal field).

In spin valve sensors, the spin valve effect varies as the cosine of the angle between the magnetization of the pinned layer and the magnetization of the free layer. Recorded data can be read from a magnetic storage medium because the external magnetic field from the magnetic storage medium causes a change in the direction of magnetization in the free layer, which in turn causes a change in resistance of the spin valve sensor and a corresponding change in the sensed current or voltage.

Figure 1:
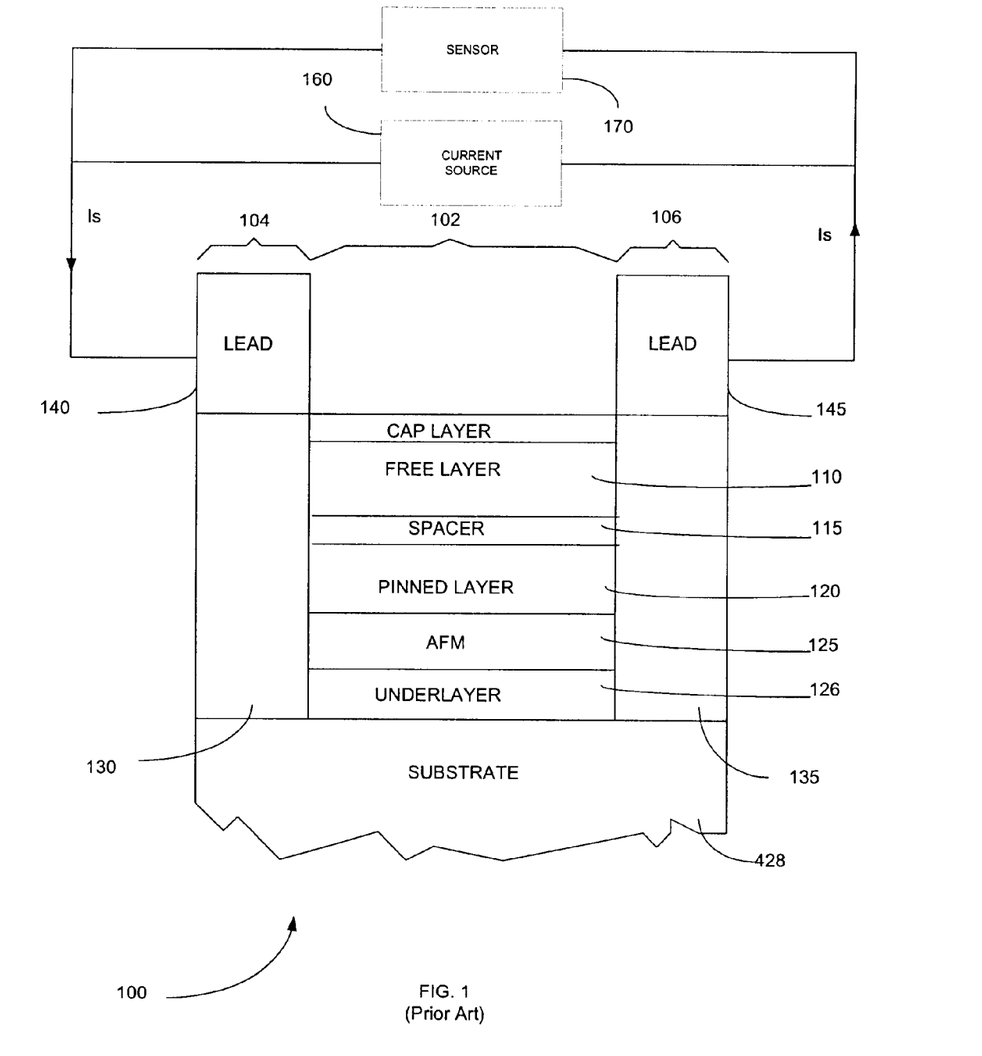
FIG. 1 is a schematic diagram of the cross-section of a prior art magnetoresistive read (MR) sensor (not drawn to scale).

FIG. 1 shows a typical spin valve sensor 100 (not drawn to scale) comprising end regions 104 and 106 separated by a central region 102. The central region 102 has defined edges and the end regions are contiguous with and abut the edges of the central region. A free layer (free ferromagnetic layer) 110 is separated from a pinned layer (pinned ferromagnetic layer) 120 by a non-magnetic, electrically-conducting spacer 115. The magnetization of the pinned layer 120 is fixed through exchange coupling with an antiferromagnetic (AFM) layer 125. An underlayer 126 is positioned below the AFM layer 125.

The underlayer 126, or seed layer, is any layer deposited to modify the crystallographic texture or grain size of the subsequent layers, and may not be needed depending on the substrate. A variety of oxide and/or metal materials have been employed to construct underlayer 126 for improving the properties of spin valve sensors. Often, the underlayer 126 may be formed of tantalum (Ta), zirconium (Zr), hafnium (Hf), or yttrium (Y). Ideally, such layer comprises NiFeCr in order to further improve operational characteristics.

Free layer 110, spacer 115, pinned layer 120, the AFM layer 125, and the underlayer 126 are all formed in the central region 102. Hard bias layers 130 and 135 formed in the end regions 104 and 106, respectively, provide longitudinal bias for the free layer 110. Leads 140 and 145 formed over hard bias layers 130 and 135, respectively, provide electrical connections for the flow of the sensing current $I_s$ from a current source 160 to the MR sensor 100. Sensor 170 is connected to leads 140 and 145 senses the change in the resistance due to changes induced in the free layer 110 by the external magnetic field (e.g., field generated by a data bit stored on a disk). IBM's U.S. Pat. No. 5,206,590 granted to Dieny et al. and incorporated herein by reference, discloses an MR sensor operating on the basis of the spin valve effect.

Figure 2A:
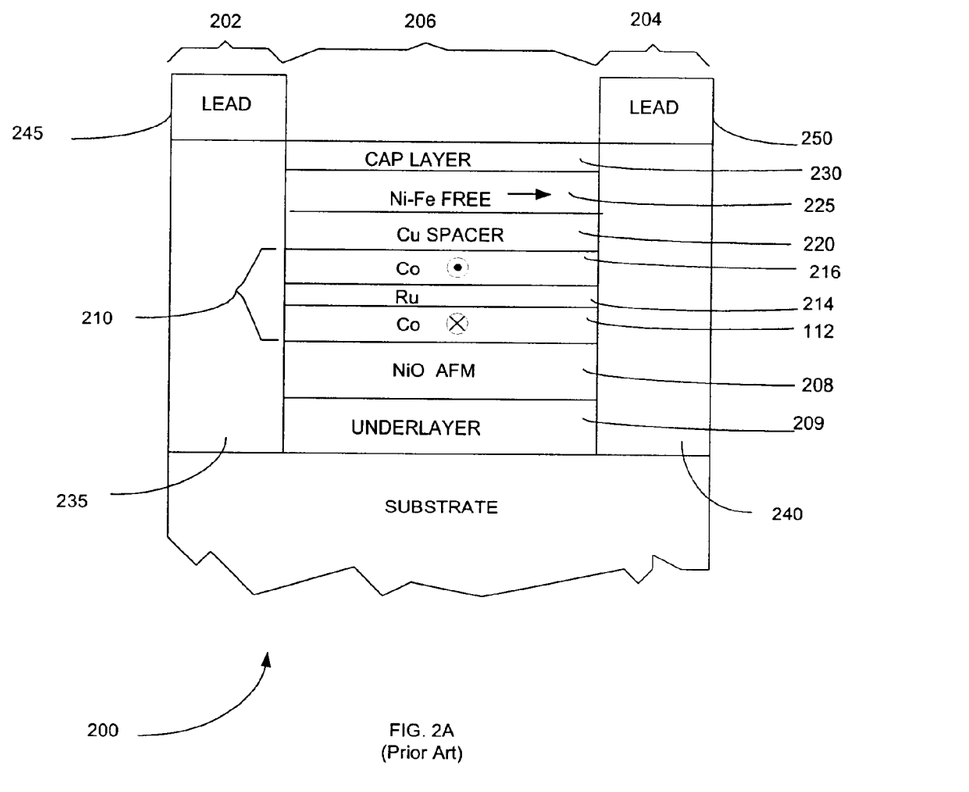
FIG. 2A shows an exemplary AP-Pinned spin valve sensor (not drawn to scale), in accordance with the prior art.

Another type of spin valve sensor is an anti-parallel (AP)-pinned spin valve sensor. FIG. 2A shows an exemplary AP-Pinned spin valve sensor 200 (not drawn to scale). Spin valve sensor 200 has end regions 202 and 204 separated from each other by a central region 206. AP-pinned spin valve sensor 200 comprises a Ni—Fe free layer 225 separated from a laminated AP-pinned layer 210 by a copper spacer layer 220. The magnetization of the laminated AP-pinned layer 210 is fixed by an AFM layer 208, or pinning layer, which is made of NiO. Again, beneath the AFM layer 208 is an underlayer 209.

The laminated AP-pinned layer 210 includes a first ferromagnetic layer 212 (PF1) of cobalt and a second ferromagnetic layer 216 (PF2) of cobalt separated from each other by a ruthenium (Ru) anti-parallel coupling layer 214. The AMF layer 208, AP-pinned layer 210, copper spacer 220, free layer 225 and a cap layer 230 are all formed sequentially in the central region 206. Hard bias layers 235 and 240, formed in end regions 202 and 204, provide longitudinal biasing for the free layer 225. Electrical leads 245 and 250 are also formed in end regions 202 and 204, respectively, to provide electrical current from a current source (not shown) to the spin valve sensor 200.

Figure 2B:
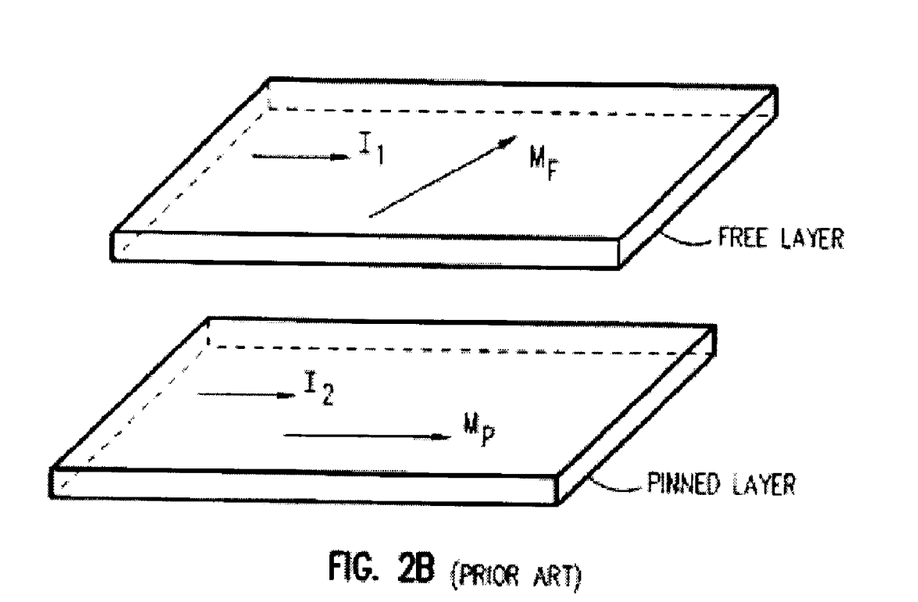
FIGS. 2B and 2C illustrate a perspective of the free and pinned layers, and a diagram of the magnetization vectors, respectively, of a prior art MR sensor.
Figure 2C:
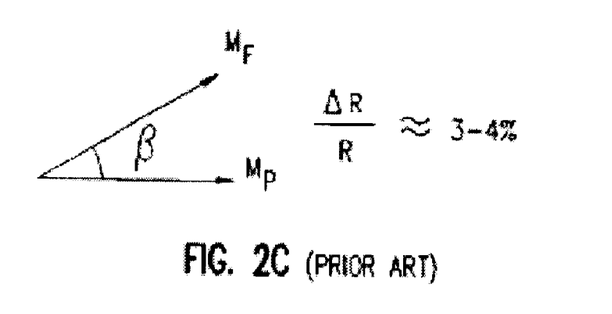

In use, the GMR effect depends on the angle between the magnetizations of the free and pinned layers. More specifically, the GMR effect is proportional to the cosine of the angle β between the magnetization vector of the pinned layer (MP) and the magnetization vector of the free layer (MF) (Note FIGS. 2B and 2C). In a spin valve sensor, the electron scattering and therefore the resistance is maximum when the magnetizations of the pinned and free layers are antiparallel, i.e., majority of the electrons are scattered as they try to cross the boundary between the MR layers. On the other hand, electron scattering and therefore the resistance is minimal when the magnetizations of the pinned and free layers are parallel; i.e., of electrons are not scattered as they try to cross the boundary between the MR layers.

In other words, there is a net change in resistance of a spin valve sensor between parallel and antiparallel magnetization orientations of the pinned and free layers. The GMR effect, i.e., the net change in resistance, exhibited by a typical prior art spin valve sensor is about 6% to 8%.

In order to effect the necessary pinning of at least one of the ferromagnetic layers to afford proper operation, it is necessary to include the hard bias layers in the context of the MR sensors of FIG. 1 and FIG. 2A. It should be noted that the pinning may also be achieved using antiferromagnetic (AFM) layers in lieu of the hard bias layers. In any case, such additional hard bias or AFM layers contribute to the size of the MR sensor. Unfortunately, this required component limits the ability of designers to reduce the overall size of MR sensors.

Figure 2D:
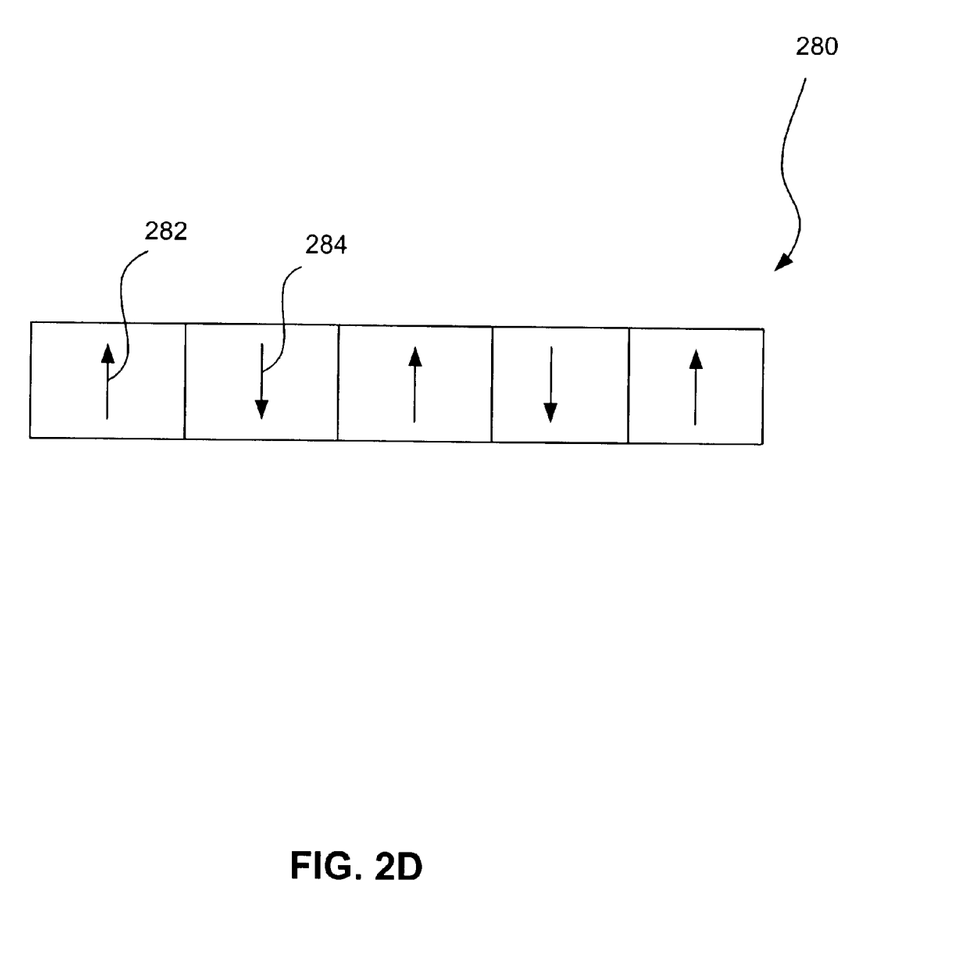
FIG. 2D illustrates a magnetic storage medium from which the MR sensors of FIG. 1 and FIG. 2A are adapted to extract data, in accordance with the prior art.

FIG. 2D illustrates a magnetic storage medium 280 from which the MR sensors of FIG. 1 and FIG. 2A are adapted to extract data. As shown, the magnetic storage medium 280 includes a plurality of transitions between a first magnetic state 282 and a second magnetic state 284. It is through these changes in state that data is stored and extracted.

Traditionally, prior art MR sensors such as those of FIG. 1 and FIG. 2A are only adapted to read one state at a time. Unfortunately, this technique does not take advantage of both states. For example, if one state (i.e. first magnetic state 282) which is being read is defective in some manner, the data being extracted may be erroneous.

There is thus a need for a MR sensor design and associated method of manufacturing the same which are capable of reducing the size of the MR sensor, and further read more than one state at a time.

DISCLOSURE OF THE INVENTION

A magnetoresistive read (MR) sensor system and a method for fabricating the same are provided. First provided are a first ferromagnetic layer, a first spacer layer positioned above the first ferromagnetic layer, and a second ferromagnetic layer positioned above the first spacer layer for working in conjunction with the first ferromagnetic layer to define a first sensor. An antiparallel coupling layer is positioned above the second ferromagnetic layer to separate the first sensor from a second sensor.

The second sensor is defined by a third ferromagnetic layer positioned above the antiparallel coupling layer, a second spacer layer positioned above the third ferromagnetic layer, and a fourth ferromagnetic layer positioned above the second spacer layer.

In one embodiment, the second ferromagnetic layer and the third ferromagnetic layer are self-pinned. Further, the first ferromagnetic layer and the fourth ferromagnetic layer may operate as free layers. For a Longitudinal recording system, the first ferromagnetic layer and the fourth ferromagnetic layer may be separated by ½ a bit length.

In another embodiment, the first sensor may be adapted to read a first magnetic state of a magnetic storage medium, and the second sensor may be adapted to simultaneously read a second magnetic state of the magnetic storage medium, where the magnetic storage medium includes a perpendicular recording system with the first and second magnetic states affording opposite polarity fields at the first and the second sensor.

In still another embodiment, the second ferromagnetic layer and the third ferromagnetic layer work in conjunction to serve in place of an antiferromagnetic layer. As an option, the antiparallel coupling layer may include Ru, the first and second spacer layers may include Cu, and the ferromagnetic layers may include CoFe.

To promote the self-pinned affect, the second ferromagnetic layer may have a first thickness that is different from a second thickness of the third ferromagnetic layer. Thus, no AFM layer or shields are necessarily required, and the present self-pinned MR sensor is ideally adapted for reading a perpendicularly recorded storage medium.

DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 3:
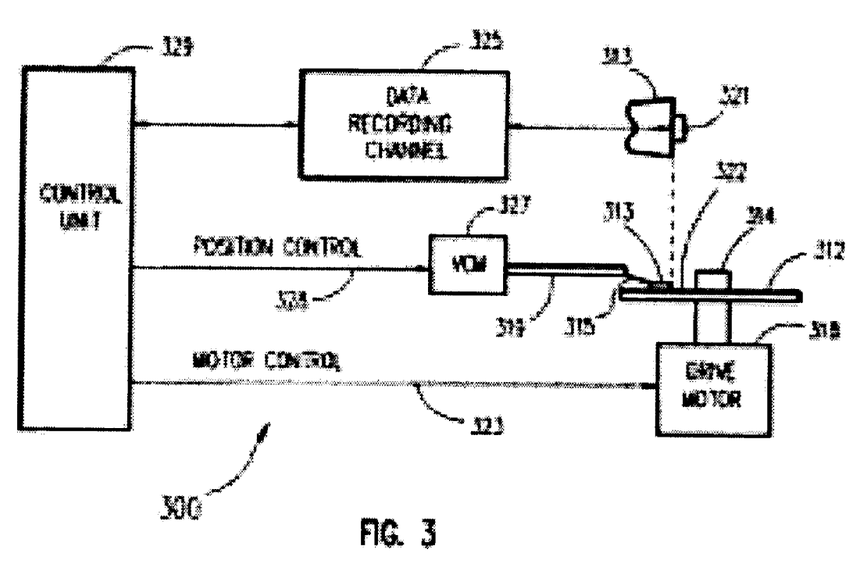
FIG. 3 is a perspective drawing of a magnetic recording disk drive system.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk 312.

At least one slider 313 is positioned on the disk 312, each slider 313 supporting one or more magnetic read/write heads 321 where the head 321 incorporates the MR sensor of the present invention. As the disks rotate, slider 313 is moved radially in and out over disk surface 322 so that heads 321 may access different portions of the disk where desired data are recorded. Each slider 313 is attached to an actuator arm 319 by way of a suspension 315. The suspension 315 provides a slight spring force which biases slider 313 against the disk surface 322. Each actuator arm 319 is attached to an actuator 327. The actuator 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a magnetic disk storage system of the present invention, and the accompanying illustration of FIG. 3 are for representation purposes only. It should be apparent that disk storage systems may contain a large number of disks and actuators, and each actuator may support a number of sliders.

Figure 4:
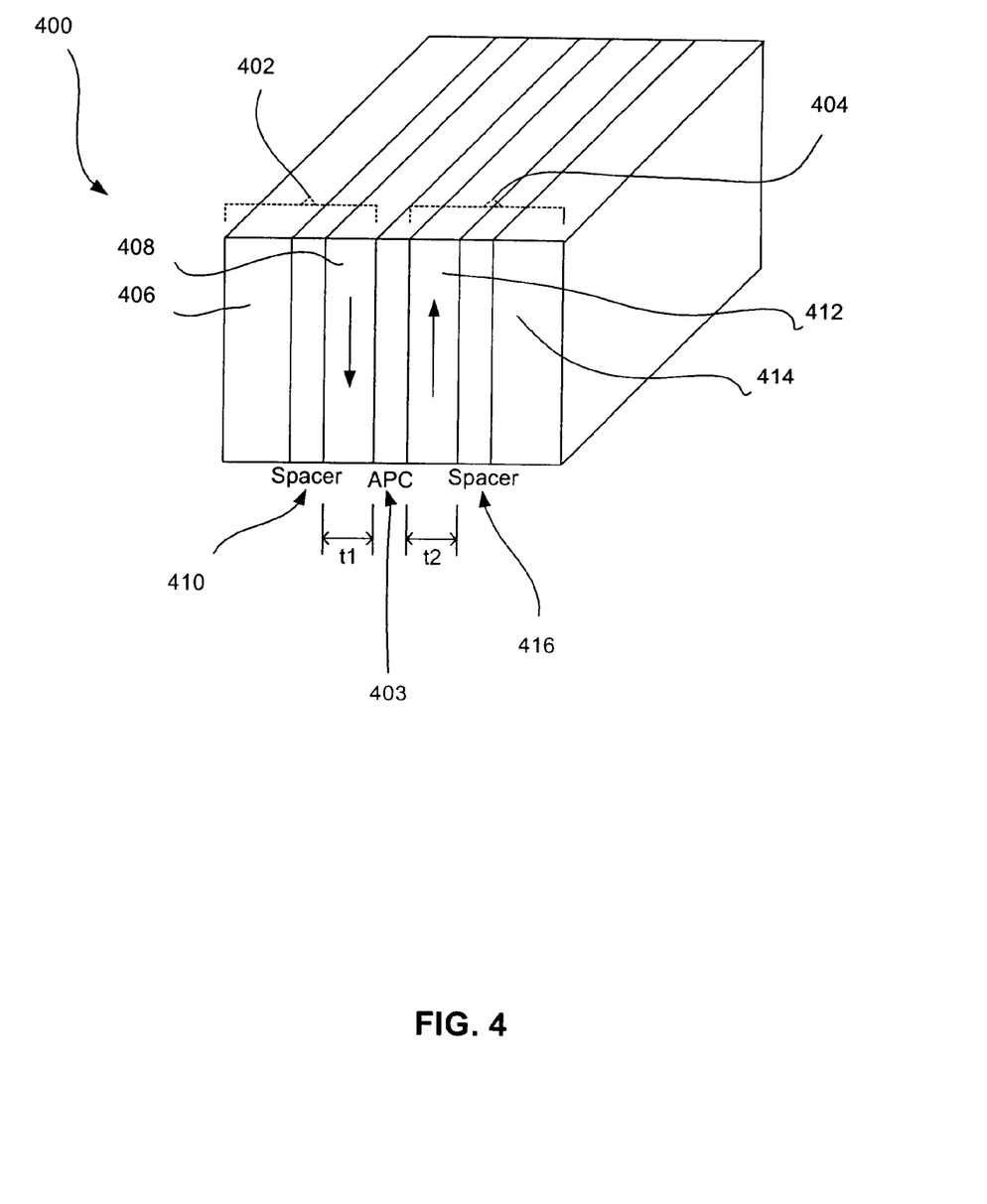
FIG. 4 is a perspective view of a MR differential sensor with a self-pinned layer, not drawn to scale, in accordance with one embodiment.

Now referring to FIG. 4, there is shown a perspective view of a magnetoresistive read (MR) sensor system 400, in accordance with one embodiment. While the present MR system 400 may be constructed in the context of the magnetic disk storage system of FIG. 3, it should be noted that the MR sensor system 400 may be implemented in any desired context.

As shown, a pair of sensors are defined including a first sensor 402 and a second sensor 404 separated by an antiparallel coupling layer 403. The first sensor 402 includes a first ferromagnetic layer 406. Positioned adjacent to the first ferromagnetic layer 406 is a first spacer layer 410. Positioned above the first spacer layer 410 is a second ferromagnetic layer 408. The second ferromagnetic layer 408 is positioned above the first spacer layer 410 for working in conjunction with the first ferromagnetic layer 406 to define the first sensor 402.

As mentioned earlier, the antiparallel coupling layer 403 is positioned above the second ferromagnetic layer 408 to separate the first sensor 402 from the second sensor 404. The second sensor 404 is defined by a third ferromagnetic layer 412 positioned above the antiparallel coupling layer 403, and a second spacer layer 416 positioned above the third ferromagnetic layer 412. Also included is a fourth ferromagnetic layer 414 positioned above the second spacer layer 416.

As will soon become apparent, the antiparallel coupling layer 403 may include Ru, the first and second spacer layers (410, 416) may include Cu, and the ferromagnetic layers (406, 408, 412, and 414) may include CoFe.

The various ferromagnetic layers are constructed in a manner such that the first ferromagnetic layer 406 and the fourth ferromagnetic layer 414 may operate as free layers. Moreover, the second ferromagnetic layer 408 and the third ferromagnetic layer 412 are "self-pinned." In other words, no external fields are necessarily required to pin such layers. Thus, no hard bias or antiferromagnetic (AFM) layers are required for pinning purposes. Further, shields are not necessarily required. In other words, the second ferromagnetic layer 408 and the third ferromagnetic layer 412 work in conjunction to serve in place of hard bias and/or AFM layers. To this end, a more compact device is thus afforded.

To achieve this, the self-pinning is afforded by subjecting the second ferromagnetic layer 408 and the third ferromagnetic layer 412 to a magnetic field during the manufacture thereof. Further, the direction of the resulting field in the second ferromagnetic layer 408 and the third ferromagnetic layer 412 may be determined by varying the thicknesses (t1, t2) thereof. In particular, the second ferromagnetic layer 408 may have a first thickness (t1) that is different from a second thickness (t2) of the third ferromagnetic layer 412.

As an option, the present embodiment may operate for a Longitudinal recording system. In such embodiment, the first ferromagnetic layer 406 and the fourth ferromagnetic layer 414 may be separated by $\frac{1}{2}\lambda$, where $\lambda$ denotes bit length.

In use, the sensors (402, 404) are capable of reading adjacent, perpendicular states recorded on a magnetic storage medium. In particular, a field associated with the second ferromagnetic layer 408 of the first sensor 402 may be oriented to read a first magnetic state of a magnetic storage medium. Moreover, the third ferromagnetic layer 412 of the second sensor 404 may be oriented to simultaneously read a second magnetic state of the magnetic storage medium which is perpendicular to the first magnetic state. See FIG. 2D for a view of such states. The magnetic storage medium may thus include a perpendicular recording system with the first and second magnetic states affording opposite polarity fields at the first and the second sensor.

Figure 5:
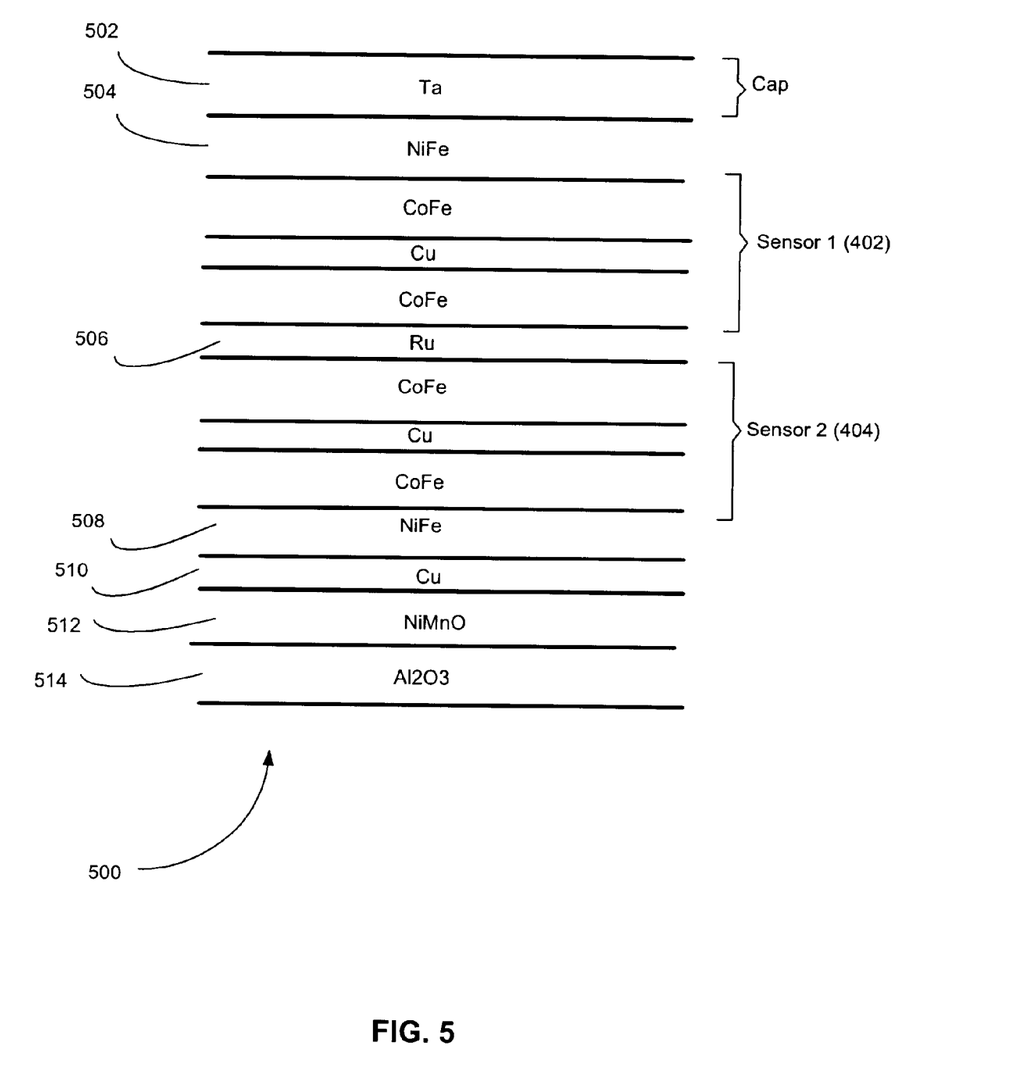
FIG. 5 illustrates an air bearing surface (ABS) view of an MR sensor, not drawn to scale, including exemplary materials, in accordance with one embodiment.

FIG. 5 illustrates an air bearing surface (ABS) view of an MR sensor 500, not drawn to scale, including exemplary materials, in accordance with one embodiment. As shown, each of the sensors (402, 404) may include a CoFe/Cu/CoFe stack. Further, the sensors may be separated by a spacer 506 constructed with Cu. Moreover, the sensors (402, 404) may be collectively constrained by a pair of NiFe layers (504, 508). Still yet, a cap layer 502 may be provided including Ta.

With continuing reference to FIG. 5, a plurality of lower layers may be provided. As shown, such lower layers may include Al2O3/NiMnO/Cu. See layers 514, 512, and 510, respectively. Of course, the foregoing materials are set forth for illustrative purposes only, and should thus not be construed as limiting in any manner.

Figure 6:
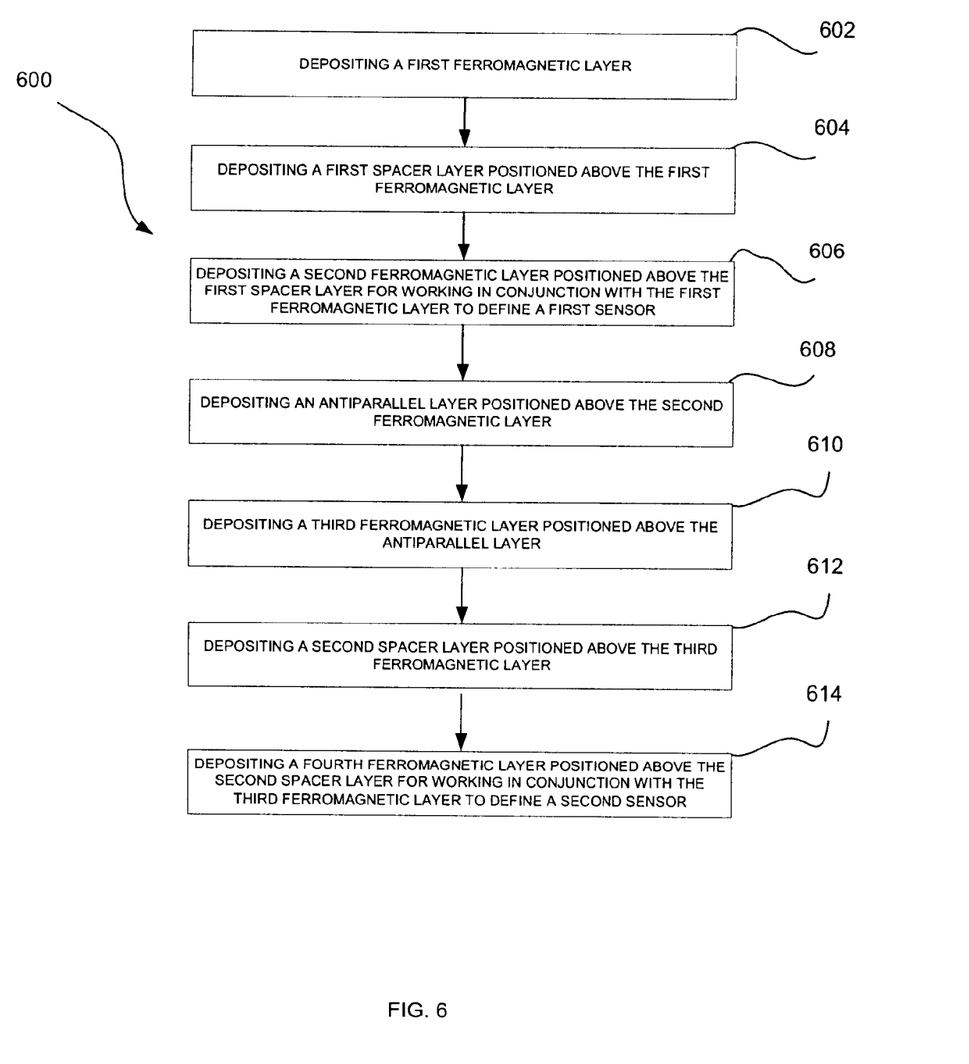
FIG. 6 illustrates a method for providing a MR differential sensor with a self-pinned layer, in accordance with one embodiment.

FIG. 6 illustrates a method 600 for providing a MR differential sensor with a self-pinned layer, in accordance with one embodiment. Initially, in operation 602, a first ferromagnetic layer is deposited over any desired lower layers. Next, in operation 604, a first spacer layer is positioned above the first ferromagnetic layer. Further, a second ferromagnetic layer is deposited above the first spacer layer for working in conjunction with the first ferromagnetic layer to define a first sensor. Note operation 606.

Next, in operation 608, an antiparallel coupling layer is positioned above the second ferromagnetic layer. Further, a third ferromagnetic layer is positioned above the antiparallel coupling layer. See operation 610. As mentioned earlier, the direction of the resulting field in the second ferromagnetic layer and the third ferromagnetic layer may be determined by providing a differential in the thicknesses thereof. Further, a magnetic field may be applied to such layers in a direction perpendicular to the ABS of the MR sensor to provide the self-pinning effect.

In operation 612, a second spacer layer is positioned above the third ferromagnetic layer. Further, a fourth ferromagnetic layer is deposited above the second spacer layer for working in conjunction with the third ferromagnetic layer to define a second sensor. See operation 614.

Due to the creation of the air bearing surface (i.e. the portion of the sensor that is cut and mechanically polished), the sensor layers are under compressive stress in the plane parallel to the air bearing surface. It is important to note that the compressive stress is put on sensor layers through the $Al_2O_3$ undercoat/overcoat after the air bearing surface formation. This compressive stress then produces tension perpendicular to the air bearing surface.

The tensile stress perpendicular to the air bearing surface in conjunction with the use of positive magnetostrictive materials for the pinned layers induces magnetic anisotropy in the pinned layers with magnetic easy axis perpendicular to the air bearing surface, i.e., pinned layer magnetization lies perpendicular to the air bearing surface as desired. The positive magnetostriction of the pinned layers can be enhanced by selecting the composition of the CoFe pinned layers to be near $Co_{50}Fe_{50}$ composition.

Thus, it should be noted that the self-pinning of the second and third ferromagnetic layers can be enhanced by using positive magnetostrictive ferromagnetic materials. Positive magnetostriction in conjunction with compressive stress induces magnetic easy axis perpendicular to the air bearing surface, which helps in pinning the magnetization of the second and third ferromagnetic layers perpendicular to the air bearing surface.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A self-pinned magnetoresistive read (MR) sensor comprising:
   a first ferromagnetic layer;
   a first spacer layer positioned above the first ferromagnetic layer;
   a second ferromagnetic layer positioned above the first spacer layer for working in conjunction with the first ferromagnetic layer to define a first sensor;
   an antiparallel coupling layer positioned above the second ferromagnetic layer;
   a third ferromagnetic layer positioned above the antiparallel coupling layer;
   a second spacer layer positioned above the third ferromagnetic layer; and
   a fourth ferromagnetic layer positioned above the second spacer layer for working in conjunction with the third ferromagnetic layer to define a second sensor;
   wherein the first ferromagnetic layer and the fourth ferromagnetic layer are free layers.

2. The self-pinned MR sensor as recited in claim 1, wherein the second ferromagnetic layer is self-pinned.

3. The self-pinned MR sensor as recited in claim 1, wherein the third ferromagnetic layer is self-pinned.

4. The self-pinned MR sensor as recited in claim 1, wherein the first ferromagnetic layer and the fourth ferromagnetic layer are separated by ½ a bit length.

5. The self-pinned MR sensor as recited in claim 1, wherein the first sensor is adapted to read a first magnetic state of a magnetic storage medium, and the second sensor is adapted to simultaneously read a second magnetic state of the magnetic storage medium which is perpendicular to the first magnetic state.

6. The self-pinned MR sensor as recited in claim 1, wherein the second ferromagnetic layer and the third ferromagnetic layer work in conjunction to serve in place of an antiferromagnetic layer.

7. The self-pinned MR sensor as recited in claim 1, wherein the antiparallel coupling layer includes Ru.

8. The self-pinned MR sensor as recited in claim 1, wherein the first and second spacer layers include Cu.

9. The self-pinned MR sensor as recited in claim 1, wherein the ferromagnetic layers include CoFe.

10. The self-pinned MR sensor as recited in claim 1, wherein the second ferromagnetic layer has a first thickness that is different from a second thickness of the third ferromagnetic layer.

11. A method of fabricating a magnetoresistive read (MR) sensor comprising:
    depositing a first ferromagnetic layer;
    depositing a first spacer layer positioned above the first ferromagnetic layer;
    depositing a second ferromagnetic layer positioned above the first spacer layer for working in conjunction with the first ferromagnetic layer to define a first sensor;
    depositing an antiparallel coupling layer positioned above the second ferromagnetic layer;
    depositing a third ferromagnetic layer positioned above the antiparallel coupling layer;
    depositing a second spacer layer positioned above the third ferromagnetic layer; and
    depositing a fourth ferromagnetic layer positioned above the second spacer layer for working in conjunction with the third ferromagnetic layer to define a second sensor;
    wherein the first ferromagnetic layer and the fourth ferromagnetic layer are free layers.

12. The method as recited in claim 11, wherein the second ferromagnetic layer is self-pinned.

13. The method as recited in claim 11, wherein the third ferromagnetic layer is self-pinned.

14. The method as recited in claim 11, wherein the first ferromagnetic layer and the fourth ferromagnetic layer are separated by ½ a bit length.

15. The method as recited in claim 11, wherein the first sensor is adapted to read a first magnetic state of a magnetic storage medium, and the second sensor is adapted to simultaneously read a second magnetic state of the magnetic storage medium which is perpendicular to the first magnetic state.

16. The method as recited in claim 11, wherein the second ferromagnetic layer and the third ferromagnetic layer work in conjunction to serve in place of an antiferromagnetic layer.

17. The method as recited in claim 11, wherein the antiparallel coupling layer includes Ru.

18. The method as recited in claim 11, wherein the first and second spacer layers include Cu.

19. The method as recited in claim 11, wherein the ferromagnetic layers include CoFe.

20. The method as recited in claim 11, wherein the second ferromagnetic layer has a first thickness that is different from a second thickness of the third ferromagnetic layer.

21. The method as recited in claim 20, wherein the first thickness and the second thickness determine a field direction of the second ferromagnetic layer and the third ferromagnetic layer.

22. A magnetoresistive read (MR) sensor comprising:
   a first ferromagnetic layer for operating as a first free layer;
   a first spacer layer positioned above the first ferromagnetic layer;
   a second ferromagnetic layer positioned above the first spacer layer;
   an antiparallel coupling layer positioned above the second ferromagnetic layer;
   a third ferromagnetic layer positioned above the antiparallel coupling layer;
   a second spacer layer positioned above the third ferromagnetic layer; and
   a fourth ferromagnetic layer positioned above the second spacer layer for operating as a second free layer;
   wherein the second ferromagnetic layer has a first thickness that is different from a second thickness of the third ferromagnetic layer such that the second ferromagnetic layer and the third ferromagnetic layer are self-pinned.

23. A disk drive system, comprising:
   a magnetic recording disk;
   a magnetoresistive read (MR) sensor including:
      a first ferromagnetic layer,
      a first spacer layer positioned above the first ferromagnetic layer,
      a second ferromagnetic layer positioned above the first spacer layer for working in conjunction with the first ferromagnetic layer to define a first sensor,
      an antiparallel coupling layer positioned above the second ferromagnetic layer,
      a third ferromagnetic layer positioned above the antiparallel coupling layer,
      a second spacer layer positioned above the third ferromagnetic layer, and
      a fourth ferromagnetic layer positioned above the second spacer layer for working in conjunction with the third ferromagnetic layer to define a second sensor,
      wherein the first ferromagnetic layer and the fourth ferromagnetic layer are free layers;
   actuator for moving the MR sensor across the magnetic recording disk so the MR sensor may access different regions of magnetically recorded data on the magnetic recording disk; and
   a controller electrically coupled to the MR sensor for detecting changes in resistance of the MR sensor.

* * * * *

UNITED STATES PATENT AND TRADEMARK OFFICE
CERTIFICATE OF CORRECTION

PATENT NO. : 6,680,828 B2
DATED : January 20, 2004
INVENTOR(S) : Gill

It is certified that error appears in the above-identified patent and that said Letters Patent is hereby corrected as shown below:

Column 1,
Line 67, after "field from the" insert -- recorded --;

Column 3,
Line 9, after "parallel; i.e.," insert -- majority --.

Signed and Sealed this

Twenty-fourth Day of August, 2004

JON W. DUDAS
*Director of the United States Patent and Trademark Office*